(12) United States Patent
Valance et al.

(10) Patent No.: US 12,532,982 B2
(45) Date of Patent: Jan. 27, 2026

(54) METHOD AND APPLIANCE FOR HEATING AND/OR COOKING FOODS WITH STEAM

(71) Applicant: SEB S.A., Ecully (FR)

(72) Inventors: Nicolas Valance, Val Suzon (FR); Laurent Blond, Beaune (FR)

(73) Assignee: SEB S.A. (FR)

( * ) Notice: Subject to any disclaimer, the term of this patent is extended or adjusted under 35 U.S.C. 154(b) by 1200 days.

(21) Appl. No.: 16/985,661

(22) Filed: Aug. 5, 2020

(65) Prior Publication Data
US 2021/0015288 A1 Jan. 21, 2021

Related U.S. Application Data

(62) Division of application No. 15/102,684, filed as application No. PCT/FR2014/053251 on Dec. 10, 2014, now abandoned.

(30) Foreign Application Priority Data

Dec. 13, 2013 (FR) ...................................... 1362546

(51) Int. Cl.
*A47J 27/04* (2006.01)
*A23L 5/10* (2016.01)

(52) U.S. Cl.
CPC .................. *A47J 27/04* (2013.01); *A23L 5/13* (2016.08); *A23V 2002/00* (2013.01); *A47J 2027/043* (2013.01)

(58) Field of Classification Search
CPC ....... A47J 27/04; A47J 2027/043; A23L 5/13; A23V 2002/00

USPC ............................................................ 99/333
See application file for complete search history.

(56) References Cited

U.S. PATENT DOCUMENTS

| | | | | |
|---|---|---|---|---|
| 2,323,623 A | * | 7/1943 | Porter ................. | A47J 37/1295 383/905 |
| 2,730,034 A | * | 1/1956 | Svendsgaard ........... | A47J 31/40 99/305 |
| 2,980,099 A | * | 4/1961 | Klemm .................... | A47J 27/04 99/473 |
| 3,069,994 A | * | 12/1962 | Lewis ..................... | A47J 27/04 126/369 |
| 3,135,190 A | * | 6/1964 | Lewis ..................... | A47J 27/16 134/132 |
| 3,440,953 A | * | 4/1969 | Griffon ............... | A47J 37/1214 426/523 |
| 4,011,805 A | * | 3/1977 | Vegh ........................ | A47J 27/16 126/369 |
| 4,233,891 A | * | 11/1980 | Schindler ................ | A47J 27/16 99/348 |

(Continued)

FOREIGN PATENT DOCUMENTS

| CA | 1199191 A | 1/1986 |
|---|---|---|
| EP | 1651084 B1 | 9/2008 |
| WO | 2004037055 A1 | 5/2004 |

*Primary Examiner* — Eric S Stapleton
(74) *Attorney, Agent, or Firm* — Lerner David LLP (57) ABSTRACT

A method for cooking and/or heating foods includes the step of supplying steam expansion chamber including a deformable and/or mobile containment wall partially delimiting an enclosure configured for receiving foods to be heated and/or cooked. The steam expansion chamber is adjacent to the enclosure receiving foods to be heated and/or cooked.

23 Claims, 6 Drawing Sheets

(56) References Cited

U.S. PATENT DOCUMENTS

| | | | | | |
|---|---|---|---|---|---|
| 4,394,221 | A | * | 7/1983 | Stage | B01D 1/065 |
| | | | | | 159/13.4 |
| 4,430,985 | A | * | 2/1984 | Huneycutt | F24B 1/202 |
| | | | | | 126/25 R |
| 4,495,932 | A | * | 1/1985 | Bratton | F22B 1/287 |
| | | | | | 99/481 |
| 4,575,615 | A | * | 3/1986 | Shigenobu | A47J 31/56 |
| | | | | | 99/279 |
| 4,603,621 | A | * | 8/1986 | Roberts | F24H 1/202 |
| | | | | | 99/295 |
| 4,899,648 | A | * | 2/1990 | Fast | A23L 7/1975 |
| | | | | | 99/403 |
| 5,320,856 | A | * | 6/1994 | Veronesi | B65B 25/001 |
| | | | | | 426/396 |
| 5,340,602 | A | * | 8/1994 | Hoche | C11B 3/14 |
| | | | | | 426/511 |
| 5,530,223 | A | * | 6/1996 | Culzoni | A21B 3/04 |
| | | | | | 239/509 |
| 6,094,840 | A | * | 8/2000 | Wanger | D06B 17/04 |
| | | | | | 68/5 C |
| 6,173,643 | B1 | * | 1/2001 | Qian | A47J 27/086 |
| | | | | | 99/413 |
| 6,237,811 | B1 | * | 5/2001 | Ford | A47J 31/401 |
| | | | | | 99/287 |
| 6,380,524 | B1 | * | 4/2002 | Keller | B65D 77/225 |
| | | | | | 426/118 |
| 6,561,079 | B1 | * | 5/2003 | Muller | A47J 31/545 |
| | | | | | 99/305 |
| 6,953,499 | B2 | * | 10/2005 | Kellens | C11B 3/12 |
| | | | | | 96/197 |
| 7,083,071 | B1 | * | 8/2006 | Crisp, III | B67D 1/0021 |
| | | | | | 222/129.3 |
| 8,931,399 | B2 | | 1/2015 | Buttiker | |
| 9,016,098 | B2 | * | 4/2015 | Larroche | B21D 51/2615 |
| | | | | | 72/91 |
| 2003/0003208 | A1 | * | 1/2003 | Lassota | A47J 31/5253 |
| | | | | | 426/433 |
| 2003/0051606 | A1 | * | 3/2003 | Cusenza | A47J 27/18 |
| | | | | | 99/357 |
| 2003/0185948 | A1 | * | 10/2003 | Garwood | A23L 13/00 |
| | | | | | 426/392 |
| 2004/0060458 | A1 | * | 4/2004 | Janka | A23L 3/0155 |
| | | | | | 426/523 |
| 2004/0081729 | A1 | * | 4/2004 | Garwood | B65B 31/028 |
| | | | | | 426/235 |
| 2004/0255871 | A1 | * | 12/2004 | Hayakawa | H05B 6/6479 |
| | | | | | 122/31.1 |
| 2006/0127549 | A1 | * | 6/2006 | Murray | B65D 81/3453 |
| | | | | | 426/393 |
| 2006/0196784 | A1 | * | 9/2006 | Murray | B65D 33/01 |
| | | | | | 206/219 |
| 2007/0048421 | A1 | * | 3/2007 | Owensby | B65D 81/343 |
| | | | | | 426/412 |
| 2008/0041235 | A1 | * | 2/2008 | Kramer | A47J 31/545 |
| | | | | | 99/293 |
| 2009/0162588 | A1 | * | 6/2009 | Palmer | B65D 1/28 |
| | | | | | 264/134 |
| 2011/0003048 | A1 | * | 1/2011 | Sugimoto | A47J 27/086 |
| | | | | | 99/468 |
| 2011/0045131 | A1 | * | 2/2011 | Ejnik | A01J 25/008 |
| | | | | | 99/453 |
| 2012/0243963 | A1 | * | 9/2012 | Larroche | B21D 51/263 |
| | | | | | 413/1 |
| 2012/0279400 | A1 | * | 11/2012 | Hayakawa | F24C 15/003 |
| | | | | | 99/403 |
| 2013/0098892 | A1 | * | 4/2013 | Zhang | A47J 27/04 |
| | | | | | 219/401 |
| 2013/0323371 | A1 | * | 12/2013 | Kutcher | A23L 2/38 |
| | | | | | 99/323.3 |
| 2015/0282662 | A1 | * | 10/2015 | Levine | F16K 15/021 |
| | | | | | 426/433 |
| 2016/0077678 | A1 | * | 3/2016 | Reese | G06F 3/0481 |
| | | | | | 99/342 |
| 2016/0167482 | A1 | * | 6/2016 | Oh | B60H 1/2225 |
| | | | | | 219/202 |
| 2018/0000285 | A1 | * | 1/2018 | Backus | A47J 37/1261 |
| 2018/0049590 | A1 | * | 2/2018 | Backus | A23D 9/00 |
| 2020/0397185 | A1 | * | 12/2020 | Glucksman | A47J 36/2433 |

* cited by examiner

METHOD AND APPLIANCE FOR HEATING AND/OR COOKING FOODS WITH STEAM

CROSS-REFERENCE TO RELATED APPLICATIONS

This application is a divisional of U.S. application Ser. No. 15/102,684, filed on Jun. 8, 2016, which is the United States national phase of International Application No. PCT/FR2014/053251 filed Dec. 10, 2014 and which claims priority to French Patent Application No. 1362546 filed Dec. 13, 2013, the disclosure of which are hereby incorporated in their entireties by reference.

FIELD OF THE INVENTION

This invention pertains to the technical field of methods and appliances for cooking and/or heating foods using steam.

More particularly, this invention pertains to methods and appliances in which contact between the food and the steam is limited or avoided.

BACKGROUND

As presented in patent EP 1 651 084, there already exists an appliance for cooking and/or heating food, comprising a steam generating device and a lid assembled in a mobile manner with respect to a container. However, the steam from the steam generating device is injected into the cooking enclosure formed by the lid and the container, for the entire cooking duration.

SUMMARY OF THE INVENTION

An aspect of this invention may provide a method for cooking and/or heating food using steam, which helps to preserve vitamins and minerals, as well as the flavor of the food.

Another aspect of this invention may provide a method for cooking and/or heating food using steam, which simplifies the heating and/or cooking of the food.

Another aspect of this invention may provide a method for cooking and/or heating food using steam, which cooks and/or heats the food quickly.

Another aspect of this invention may provide a method for cooking and/or heating food using steam, which can be used to prepare sauces and/or sauce dishes.

Another aspect of this invention may provide a method for cooking and/or heating food using steam, in which any crushing of the food is limited or prevented.

Another aspect of this invention may provide an appliance for cooking and/or heating food using steam, which helps preserve vitamins and minerals, as well as the flavor of the food.

Another aspect of this invention may provide an appliance for cooking and/or heating food using steam, which is simple to use.

Another aspect of this invention may provide an appliance for cooking and/or heating food using steam, which cooks and/or heats food quickly.

Another aspect of this invention may provide an appliance for cooking and/or heating food using steam, which can be used to prepare sauces and/or sauce dishes.

Another aspect of this invention may provide an appliance for cooking and/or heating food using steam, which facilitates the production of a series of several dishes.

Another aspect of this invention may provide an appliance for cooking and/or heating food using steam, in which any crushing of the food is limited or prevented.

These aspects may be reflected in a method for cooking and/or heating food, consisting of supplying steam to a steam expansion chamber comprising a deformable and/or mobile containment wall partially delimiting an enclosure receiving food to be heated and/or cooked. Thus the food can be cooked in a contained manner, while limiting or preventing any watering down of the food by the steam. Such a method makes it possible to preserve vitamins and minerals, as well as the flavor of the food. This method does not require any prior wrapping of the food, which can simply be placed inside the enclosure. Sauces and/or sauce dishes can be prepared using this method.

Advantageously, the method consists of supplying steam to the enclosure before performing at least one heating and/or cooking phase without supplying steam to the enclosure. This arrangement makes it possible to obtain a quicker temperature increase of the food inside the enclosure, which helps to preserve the vitamins and minerals, while offering the benefit of contained heating and/or cooking of the food once the temperature of the food has risen enough, thereby preventing the steam from watering down the food.

In one method of implementation, the method consists of supplying steam to the enclosure for a given period of time. This arrangement makes it possible to avoid the use of a temperature measurement, such a measurement being difficult to take in a simple, inexpensive manner to obtain a reliable temperature reading of the food. In particular, the method may consist of supplying steam to the enclosure for a period of between 1 and 3 minutes. A quick temperature increase helps to better preserve vitamins and minerals.

In another method of implementation, the method consists of using an enclosure comprising at least one steam supply inlet opening, for injecting steam into the enclosure through the one or more inlet opening(s), in a first phase, and of using the steam supply to the steam expansion chamber to block the one or more inlet opening(s) with the containment wall, in a second phase. Such a method makes it possible to supply the enclosure with steam in the first phase, and then stop the supply of steam to the enclosure in a second phase, without requiring a shorter duration. These arrangements do not require any particular control devices.

As a further advantage, the method consists of using an enclosure comprising at least one outlet opening and of supplying the enclosure with steam to push out the air present in the enclosure through the one or more outlet opening(s). This arrangement makes it possible to evacuate the air present in the enclosure when the steam is let into the enclosure, which also helps to quicken the heating and/or cooking of the food present inside the enclosure. The evacuation of the air, and therefore of oxygen, out of the enclosure, also helps to limit oxidation of delicate nutrients.

Thus, advantageously, the method consists of using the supply of steam to the steam expansion chamber to block the one or more outlet opening(s) with the containment wall. These arrangements do not require any particular control devices in order to block the one or more outlet opening(s).

As a further advantage, the method consists of regulating the pressure inside the steam expansion chamber. This arrangement makes it possible to limit any crushing of the food.

Thus, advantageously, the method consists of limiting the pressure inside the steam expansion chamber to a value of less than or equal to 10 millibars, and preferably less than or equal to 5 millibars. Such values make it possible, in particular, to press the containment wall against the food while limiting any crushing of said food.

As a further advantage, the method may include a step consisting of injecting air into the steam expansion chamber, to deform and/or move the containment wall toward the interior of the enclosure. This arrangement helps to improve the pressing of the containment wall on the food. In particular, this arrangement helps to prevent the retraction of the containment wall once there is no longer any steam being supplied to the steam expansion chamber, as a result of the condensation of the steam.

As a further advantage, the method may include a step consisting of sucking out at least a portion of the air present inside the enclosure, in order to deform and/or move the containment wall toward the interior of the enclosure. This arrangement also helps to improve the pressing of the containment wall on the food, if desired, before any steam is supplied to the steam expansion chamber. This arrangement makes it possible to obtain better heat conduction for cooking and/or heating food.

These aspects may also be reflected in an appliance for cooking and/or heating food, comprising a steam generating device and an enclosure for receiving food to be heated and/or cooked, given the fact that this appliance comprises a steam expansion chamber supplied with steam by the steam generating device, and that the steam expansion chamber comprises a deformable and/or mobile containment wall partially delimiting the enclosure. Thus the containment wall is warmed by the steam from the steam generating device. This arrangement makes it possible to provide contained cooking without the use of a cooking bag. The deformable and/or mobile wall can come into contact with the food to help heat and/or cook it.

In one advantageous method of implementation, the containment wall is at least partially made of an elastically deformable, flexible material. This arrangement facilitates the adjustment of the enclosure's volume to the food present inside the container. This arrangement also helps improve the efficacy of the heat exchange between the steam and the food. Alternatively, the containment wall may comprise, in particular, at least one rigid part surrounded by a deformable part.

Thus, advantageously, the containment wall has a resting position that is at least partially concave with respect to the enclosure. This arrangement makes it possible to obtain an enclosure with a larger volume while maintaining a compact construction.

Also advantageously, the enclosure is partially delimited by a removable container. This arrangement facilitates the placement and removal of the food. This arrangement also facilitates the cleaning of the appliance.

Thus, advantageously, the container holds a removable slotted rack and has a juice collection area arranged beneath a slotted part of the slotted rack. This arrangement makes it possible to collect the juices running out of the food.

Also advantageously, the enclosure comprises at least one inlet opening leading from the steam generating device for injecting steam into the enclosure. This arrangement makes it possible to obtain a quicker temperature increase of the food present inside the enclosure, by injecting steam into the enclosure at the start of the heating and/or cooking of the food, to saturate it in steam.

Thus, advantageously, the one or more inlet opening(s) are arranged in the container. This arrangement makes it possible to obtain a particularly simple construction.

Also advantageously, the containment wall moved by the steam present inside the steam expansion chamber may occupy at least one position blocking the one or more inlet opening(s). This arrangement makes it possible to inject steam into the enclosure for a limited period of time, while maintaining the simple construction of the appliance.

Also advantageously, the enclosure comprises at least one outlet opening leading to the exterior of the appliance. This arrangement makes it possible, in particular, to evacuate the air present inside the enclosure when the steam is let into the enclosure. The evacuation of the air inside the enclosure also helps to accelerate the heating and/or cooking of the food inside the enclosure. The evacuation of the air, and therefore of oxygen, out of the enclosure also helps to limit the oxidation of delicate nutrients.

Thus, advantageously, the one or more outlet opening(s) are arranged in an airtight ring attached to a part of the enclosure that is mobile with respect to the container. This arrangement makes it possible to obtain a particularly simple construction.

Also advantageously, the containment wall moved by the steam present inside the steam expansion chamber can occupy at least one position blocking the one or more outlet opening(s). Thus, the containment of the enclosure containing the food can be obtained simply by filling the steam expansion chamber, after the air has been evacuated. This arrangement simplifies the construction of the appliance.

Also advantageously, the appliance comprises a control means for operating the steam production of the steam generating device according to the steam pressure inside the steam expansion chamber. This arrangement makes it possible to limit any crushing of the food.

Also advantageously, the control means is designed to start the cooking process in at least one of the aforementioned characteristics.

BRIEF DESCRIPTION OF THE DRAWINGS

The invention will be easier to understand upon review of one non-limiting example of implementation illustrated in the attached FIGS. 1 through 11, in which.

DETAILED DESCRIPTION OF THE INVENTION

Figure 1:
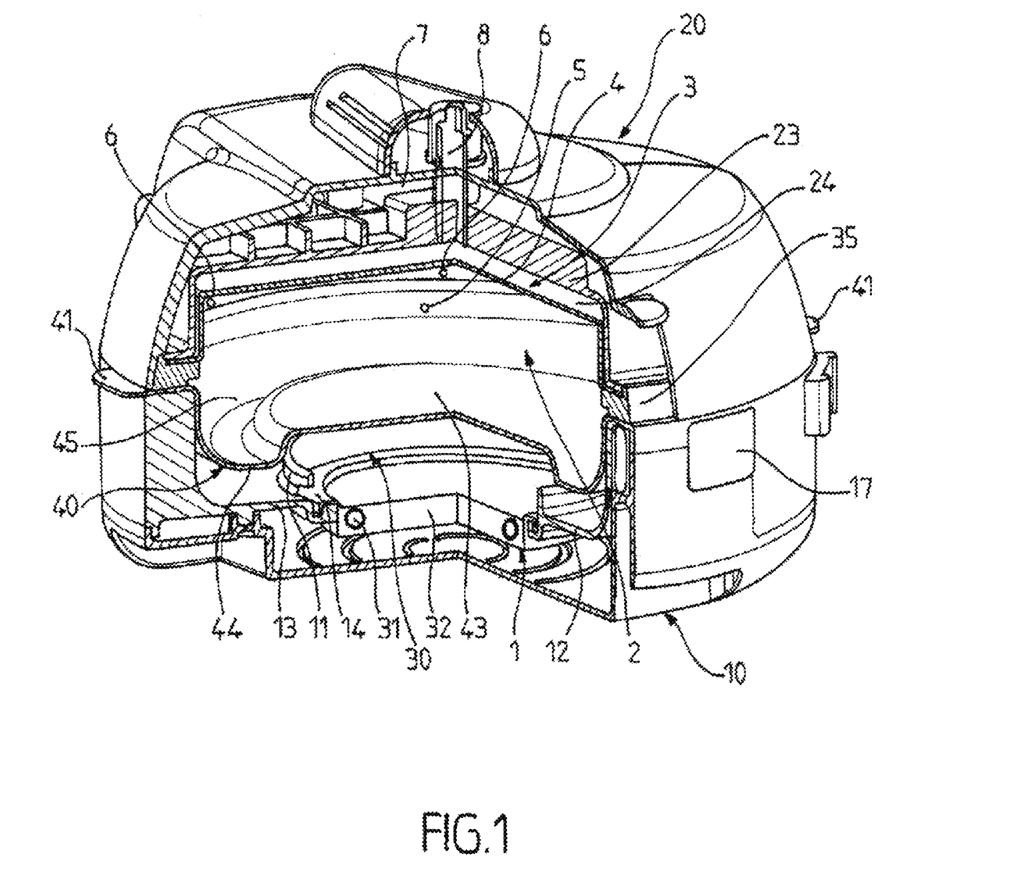
FIG. 1 is a partial cross-section perspective view of one example of implementing an appliance for cooking and/or heating food as described in the invention, in which the enclosure for receiving the food to be cooked and/or heated is in the closed configuration.

The appliance for cooking and/or heating food illustrated in FIG. 1 comprises a steam generating device (1) and an enclosure (2) for receiving the food to be cooked and/or heated.

Figure 4:
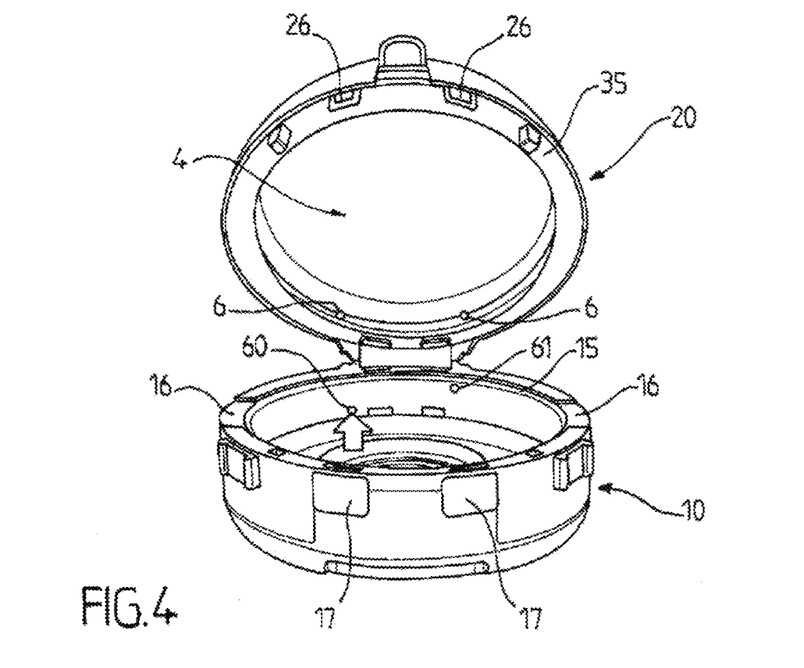
FIG. 4 is a front perspective view of the appliance illustrated in FIG. 1, in which the enclosure for receiving the food to be cooked and/or heated is in the open configuration, the container illustrated in FIGS. 2 and 3 having been removed.
Figure 5:
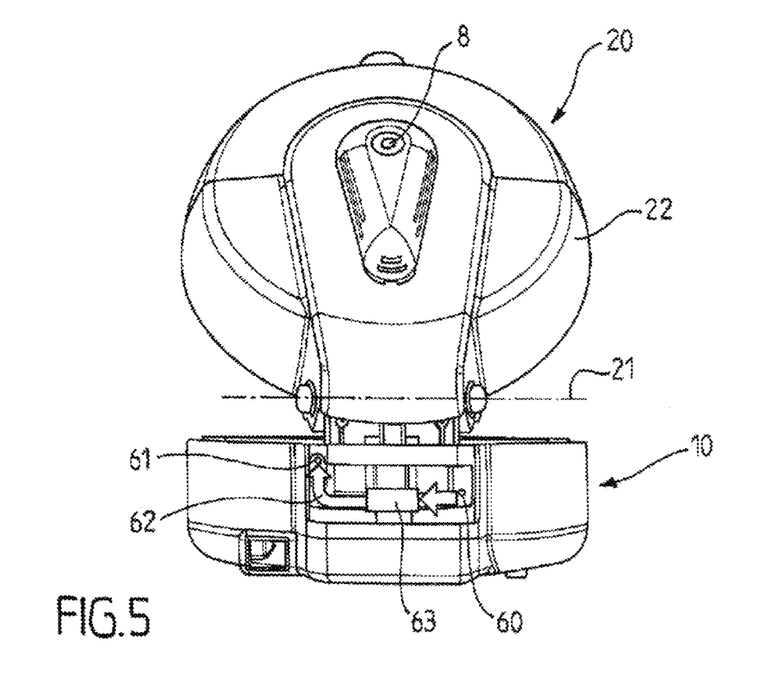
FIG. 5 is a back perspective view of the appliance illustrated in FIG. 4, in which one component of the casing has been removed to show one portion of the steam circulation.
Figure 6:
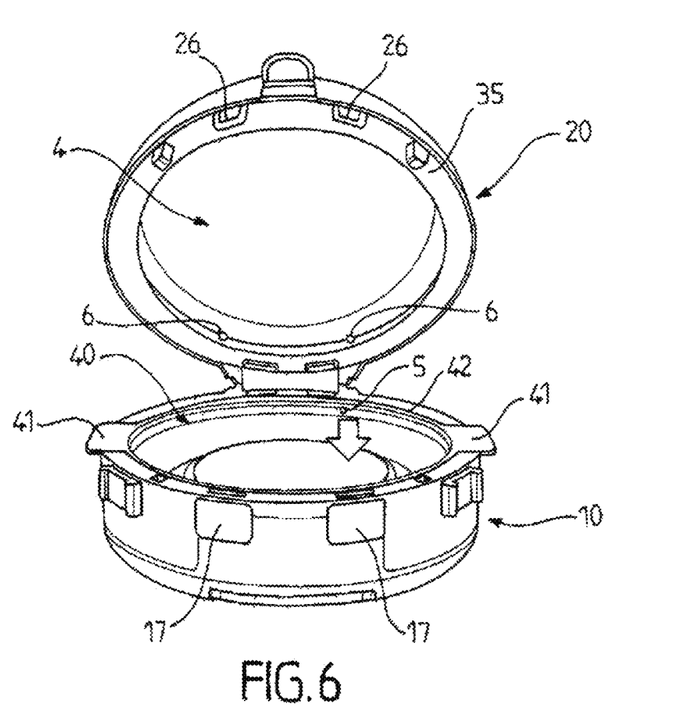
FIG. 6 is a front perspective view of the appliance illustrated in FIG. 4, in which the container illustrated in FIGS. 2 and 3 is in place, showing the injection of steam into the enclosure.

The enclosure (2) may be in a closed configuration, for cooking and/or heating the food, depicted in FIG. 1, and an open configuration, depicted in FIGS. 4, 5 and 6, in which the food can be placed inside or removed.

In the example of implementation illustrated in the figures, the enclosure (2) is formed between a container (40) and a lid (20). The container (40) is designed to receive the food to be cooked and/or heated. Preferably, the container (40) is removable, so that it can be used as a serving piece at the dining table.

In the example of implementation illustrated in the figures, the lid (20) is assembled in a mobile manner on a main body (10). The lid (20) is assembled, for example, in a pivoting manner on the main body (10) along a roughly horizontal axis (21), as depicted in FIG. 5.

The steam generating device (1) comprises a water tank (30) combined with a heating element (31).

In the example of implementation illustrated in the figures, the steam generating device (1) is arranged beneath the enclosure (2). The steam generating device (1) is arranged in the main body (10). The water tank (30) is delimited by an annular rib (11) arranged on a bottom (12) of an internal tub (13) of the main body (10). The heating element (31) is built into a heating plate (32). The heating element (31) and the heating plate (32) may be part of a heating bottom used in kettles. The heating element (31) may have, for example, 2000 W of power. The heating plate (32) is surrounded by the annular rib (11). An annular seal (14) is interposed between the heating plate (32) and the annular rib (11). The heating plate (32) thus forms the greater part of the bottom of the water tank (30).

Figure 2:
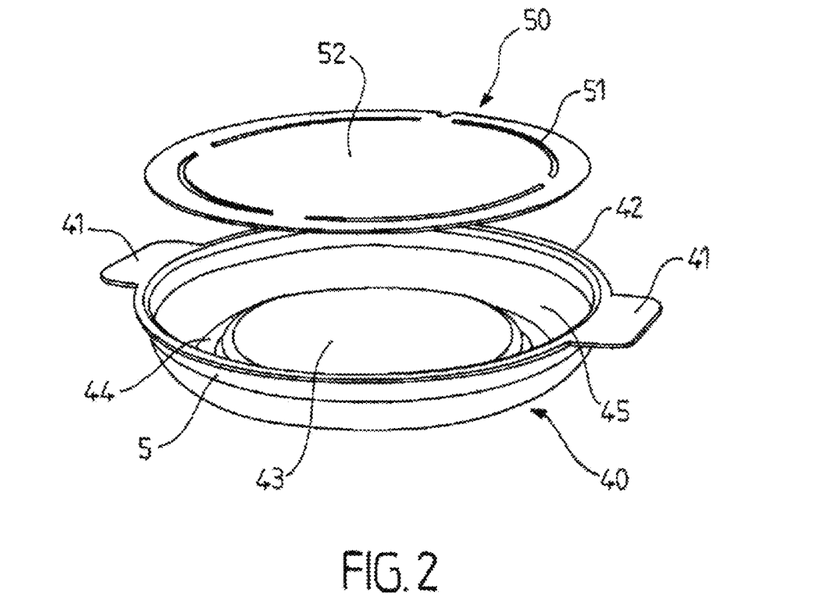
FIG. 2 is a perspective view of a slotted rack used with a container attached to the appliance illustrated in FIG. 1.

As depicted in FIG. 2, the container (40) comprises two handles (41) arranged opposite one another. The handles (41) stem from an upper edge (42) of the container (40). As shown in FIG. 6, the handles (41) extend to the exterior of the appliance. The handles (41) extend between the main body (10) and the lid (20). This arrangement makes it easier to obtain cool handles. As an alternative or complement, the container (40) and/or the handles (41) may be made of a material that does not conduct heat well, such as plastic or stainless steel.

Figure 3:
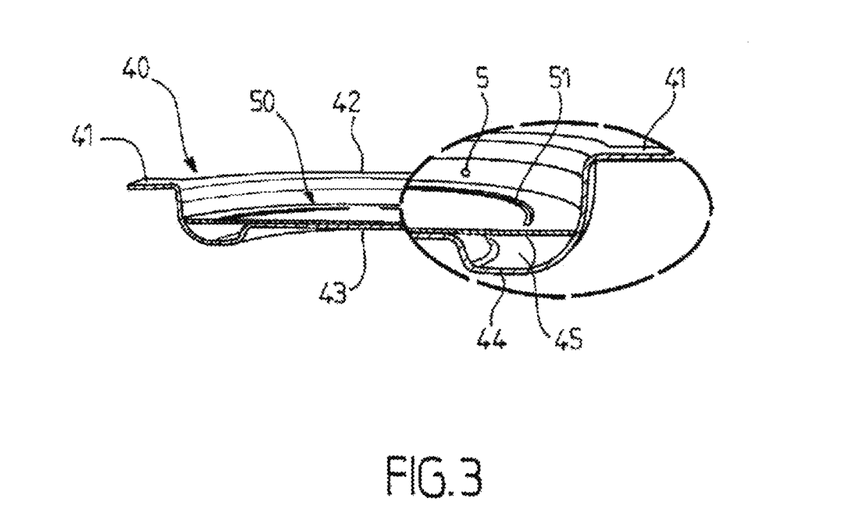
FIG. 3 is a cross-section perspective view of the slotted rack and of the container illustrated in FIG. 2, with one portion enlarged.

Preferably, the container (40) comprises at least one juice collection area (45). As shown in FIGS. 2 and 3, the bottom of the container (40) has a raised part (43). A peripheral annular groove (44) surrounds the raised part (43) of the bottom of the container (40) and forms the juice collection area (45).

As depicted in FIG. 1, the container (40) is adjusted inside the main body (10). The upper edge (42) of the container (40) rests on an internal lip (15) of the main body (10), which is better seen in FIG. 4. Thus, the space between the container (40) and the main body (10) remains contained. The internal lip (15) of the main body (10) is extended by notches (16) designed for the handles (41) of the container (40) to pass through.

FIG. 2 also shows a slotted rack (50) designed to be used with the container (40). As depicted in FIG. 3, the container (40) holds the removable slotted rack (50). The juice collection area (45) is arranged beneath a slotted part (51) of the slotted rack (50).

The slotted rack (50) rests on the raised part (43) of the container (40) and extends above the peripheral annular groove (44). The slotted rack (50) comprises a slotted part (51) arranged above the peripheral annular groove (44) forming the juice collection area (45). The slotted rack (50) comprises a non-slotted part (52) arranged above the raised part (43) of the bottom of the container (40). Thus, the juice collection area (45) is annular and extends around the raised part (43) of the bottom of the container (40) exposed to the flow of steam from the steam generating device (1).

As shown in FIG. 1, the container (40) is held by the main body (10). The container (40) is assembled in a removable manner with respect to the main body (10). The raised part (43) of the bottom of the container (40) extends above the heating element (31). Thus, the non-slotted part (52) of the slotted rack (50) is arranged above the heating element (31) and the water tank (30).

In the example of implementation illustrated in the figures, the lid (20) is assembled in a manner with respect to the main body (10) in which it is mobile between a raised position in order to place the food inside the container (40) and/or remove food from the container (40), illustrated in FIGS. 4, 5 and 6, and a lowered position in order to cook and/or heat the food placed inside the container (40), illustrated in FIG. 1. To this end, the main body (10) comprises at least one unlocking mechanism (17) combined with a latching mechanism (not depicted in the figures) designed to interact with a locking mechanism (26) that is part of the lid (20).

The appliance for cooking and/or heating food comprises a steam expansion chamber (3) supplied with steam by the steam generating device (1). The steam expansion chamber (3) is adjacent to the enclosure (2).

In the example of implementation illustrated in the figures, the steam expansion chamber (3) is arranged above the enclosure (2). More particularly, the steam expansion chamber (3) is arranged in the lid (20). In other words, the lid (20) holds the steam expansion chamber (3).

The steam expansion chamber (3) comprises a containment wall (4) partially delimiting the enclosure (2). The containment wall (4) is deformable and/or mobile.

Moreover, in the example of implementation illustrated in the figures, the enclosure (2) is partially delimited by the removable container (40).

In the example of implementation illustrated in the figures, the lid (20) comprises an exterior shell (22) advantageously connected to the main body (10), as well as a lower shell (23) housing a cavity (24) with a lower opening. The containment wall (4) is held by the lid (20). The containment wall (4) is arranged beneath the lower shell (23) and thus delimits, with the lower shell (23), the steam expansion chamber (3). The containment wall (4) is arranged above the container (40). The lid (20) holds an airtight ring (35) that is supported on an upper edge (42) of the container (40). Thus, the airtight ring (35) is part of a portion of the enclosure (2) that is mobile with respect to the container (40). The edge of the containment wall (4) is inserted between the airtight ring (35) and the lid (20). The enclosure (2) is thus delimited by the container (40), the airtight ring (35) and the containment wall (4). The containment wall (4) is mobile with respect to the container (40) when the lid closes the enclosure (2).

In one preferred method of implementation illustrated in the figures, the containment wall (4) is in the form of a sheet of elastically deformable, flexible material. The containment wall (4) is advantageously made of FEP (fluorinated ethylene propylene copolymer or tetrafluoroethylene perfluoro propylene), this material offering the advantage of being less prone to absorbing food odors than silicones.

As shown in FIG. 1, the containment wall (4) has a resting position that is at least partially sunken inside the lid (20). Thus the containment wall (4) has a resting position that is at least partially concave with respect to the enclosure (2).

Figure 10:
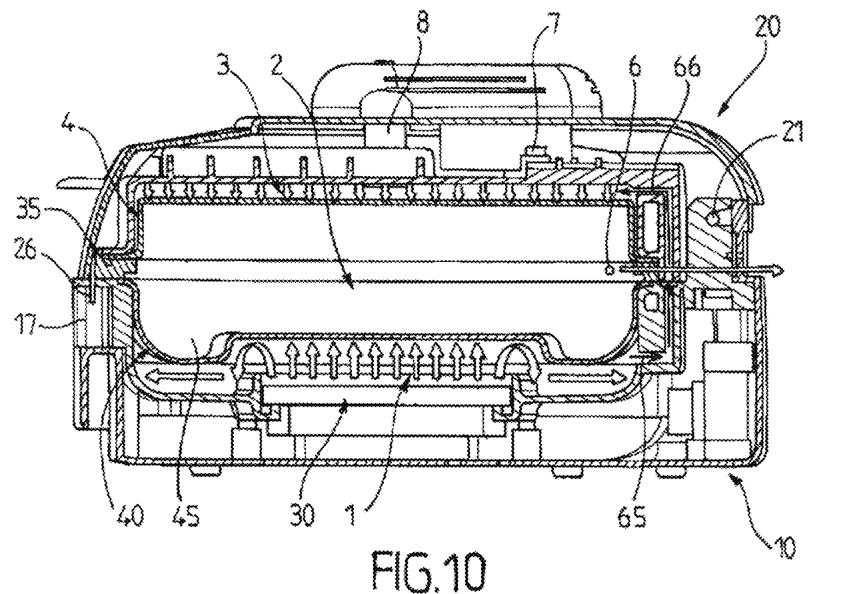
FIG. 10 is a cross-section elevation view of the appliance illustrated in FIG. 1, showing a containment wall of the appliance in the resting configuration.
Figure 11:
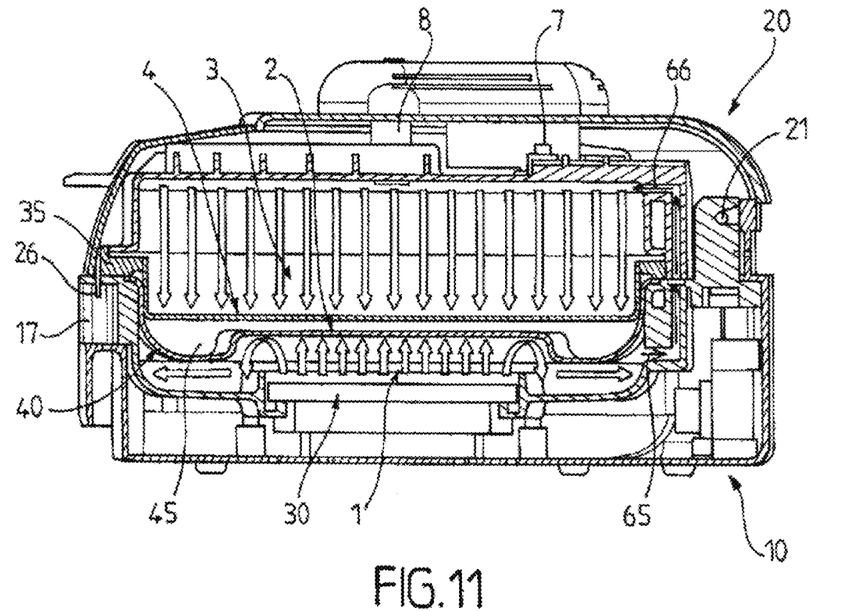
FIG. 11 is a cross-section elevation view of the appliance illustrated in FIG. 1, showing the containment wall of the appliance in the working configuration under the effect of the steam.

In the example of implementation illustrated in the figures, the steam expansion chamber (3) is supplied with steam from the steam generating device (1) by at least a first conduit (65) arranged inside the main body (10), connecting a lower part of the main body (10) below the container (40) to an upper portion of the main body (10) on the exterior of the interior lip (15) of the main body (10) holding the container (40), said first conduit (65) being connected to a second conduit (66) arranged in the lid (20), connecting a lower part of the lid (20) to the exterior of the containment wall (4) to an internal surface of the lid (20) to the interior of the containment wall (4), as shown in FIGS. 10 and 11.

Figure 7:
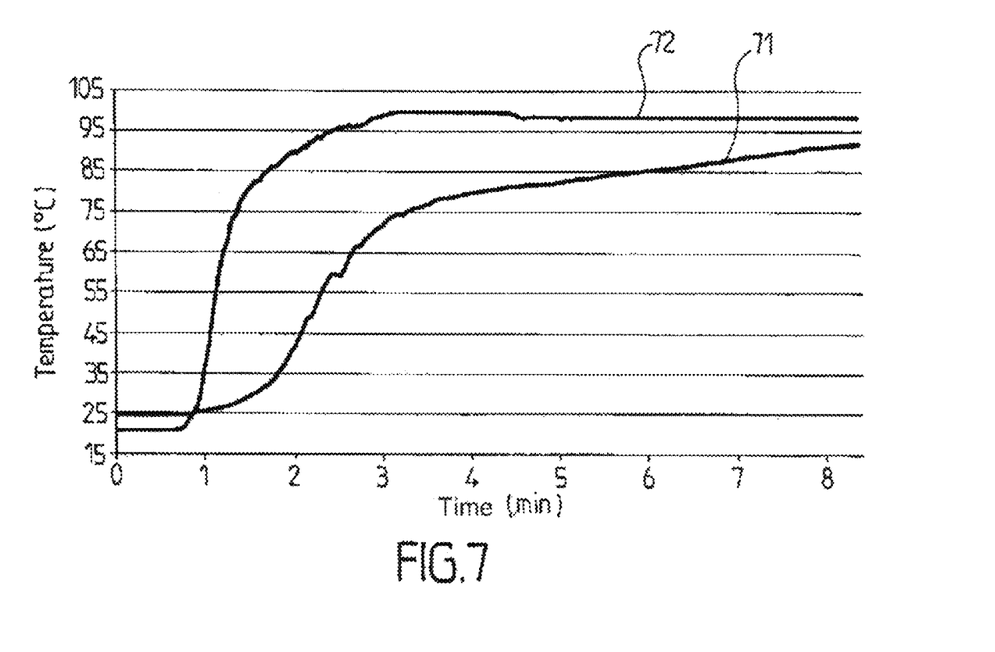
FIG. 7 is a comparative graph showing the temperature increase inside the enclosure, with steam injection and without steam injection.

In one preferred method of implementation, the enclosure (2) comprises at least one inlet opening (5) leading from the steam generating device (1) to inject steam into the enclosure (2). Tests illustrated in FIG. 7 show that the temperature increase inside the enclosure (2) is quicker when steam is let into the enclosure (2), than when no steam is let into the enclosure (2) (to reach 100° C., 3 minutes as compared to 8 minutes). The curve labeled 71 shows the temperature change inside the enclosure (2) without steam. The curve labeled 72 shows a change inside the enclosure (2) when steam is let into the enclosure (2).

In the example of implementation illustrated in the figures, the one or more inlet opening(s) (5) are arranged in the container (40). As illustrated in FIG. 3, an inlet opening (5) is arranged above the slotted rack (50). As shown in FIGS. 4 and 5, the main body (10) has a lower lateral opening (60) arranged beneath the container (40) and an upper lateral opening (61) arranged facing the inlet opening (5) arranged in the container (40). The lower lateral opening (60) is connected to the upper lateral opening (61) by a transfer conduit (62) arranged in the internal wall of the main body (10), as depicted schematically in FIG. 5.

In order to prevent the food from being watered down by the steam, the one or more inlet opening(s) (5) may be blocked by the containment wall (4) when the steam expansion chamber (3) is supplied with steam by the steam generating device (1). Thus, the containment wall (4) moved by the steam inside the steam expansion chamber (3) can occupy at least one position blocking the one or more inlet opening(s) (5).

As a variation, the transfer conduit (62) may comprise a solenoid valve (63) to control the inlet of steam inside the enclosure (2) independently of the inlet of steam into the steam expansion chamber (3), as depicted in FIG. 5.

Figure 9:
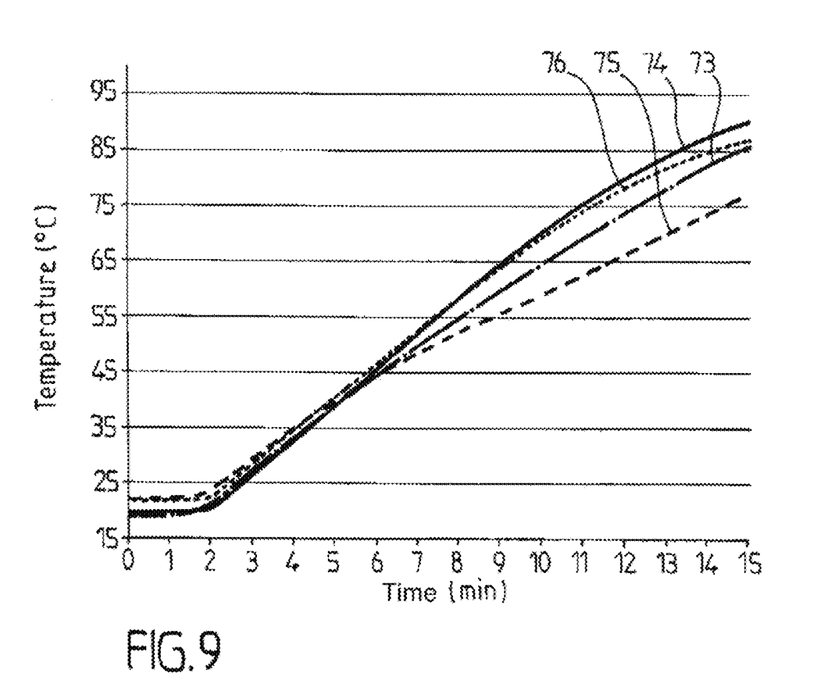
FIG. 9 is a comparative graph showing the temperature increase inside the enclosure, with air evacuation and without air evacuation.

In one preferred method of implementation, the enclosure (2) comprises at least one outlet opening (6) leading to the exterior of the appliance. Tests illustrated in FIG. 9 show that the temperature increase of the food is quicker if the air is evacuated from the enclosure (2). The curves labeled 73 and 74 show the temperature change in a food when the air is evacuated from the enclosure (2). The curves labeled 75 and 76 show the temperature change in a food when the air is not evacuated from the enclosure (2).

In order to prevent heat loss after the air has been pushed out of the enclosure (2), the one or more outlet opening(s) (6) can be blocked by the containment wall (4) when the steam expansion chamber (3) is supplied with steam by the steam generating device (1). Thus, the containment wall (4) moved by the steam inside the steam expansion chamber (3) can occupy at least one position blocking the one or more outlet opening(s) (6).

Figure 8:
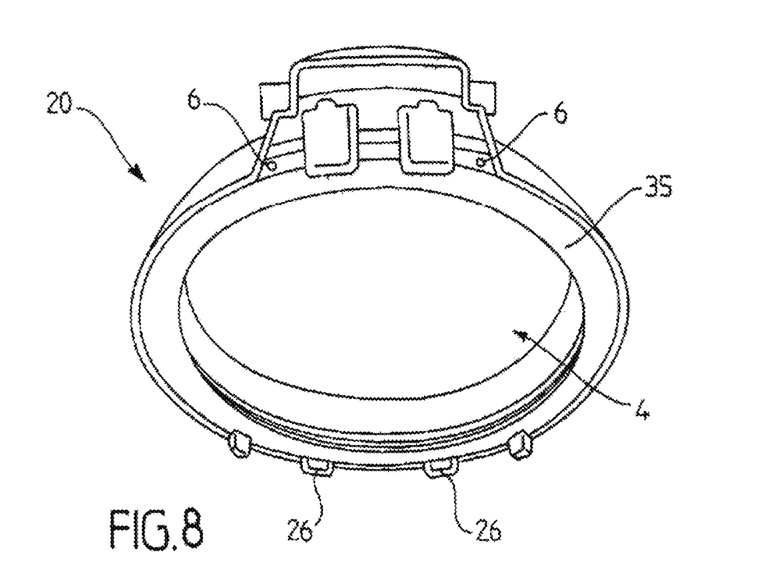
FIG. 8 is a back perspective partial view of the appliance illustrated in FIG. 1, showing air outlet openings.

In the example of implementation illustrated in the figures, the one or more outlet opening(s) (6) are arranged in the airtight ring (35). FIG. 8 shows two outlet openings (6) arranged in the airtight ring (35) at the place where the lid (20) is attached.

FIG. 10 shows an outlet opening (6) leading to the exterior of the appliance. In the configuration in FIG. 11, the containment wall (4) extends into the container (40) and blocks the one or more inlet opening(s) (5), as well as the one or more outlet opening(s) (6) (not visible in FIG. 11). The slotted rack (50) is not depicted in FIGS. 10 and 11, but can be placed inside the container (40) if desired.

The appliance comprises a control means (7) to operate the production of steam by the steam generating device (1) according to the steam pressure inside the steam expansion chamber (3).

In the example of implementation illustrated in the figures, the control means (7) comprises a low pressure switch measuring the pressure inside the steam expansion chamber (3). The pressure switch is coupled with a contactor to control the supply of electricity to the heating element (31). The pressure switch has a high threshold, such as 4 mbar, and a low threshold, such as 2.5 mbar. As long as the pressure inside the steam expansion chamber (3) remains lower than the high threshold, the heating element (31) is receiving electrical power. If the pressure inside the steam expansion chamber (3) exceeds the high threshold, the electrical power supplied to the heating element (31) is switched off. The electrical power supplied to the heating element (31) remains switched off as long as the pressure inside the steam expansion chamber (3) remains greater than the low threshold. If the pressure inside the steam expansion chamber (3) falls back below the low threshold, the heating element (31) begins once again to receive electrical power.

As a variation, the control means (7) may comprise, in particular, a temperature sensor arranged to measure the temperature inside the steam expansion chamber (3), in order to control the electrical power supplied to the heating element (31) and/or to control a solenoid valve to regulate the pressure inside the steam expansion chamber (3).

A safety valve (8) may be provided to connect the steam expansion chamber (3) with the exterior in the event of excess pressure. In the example of implementation illustrated in the figures, the safety valve (8) is assembled on the lid (20).

The appliance described in the invention operates and is used in the following manner:

The user opens the enclosure (2), fills the water tank (30) and places the food inside the enclosure (2). The user may place the food in the container (40) in place inside the enclosure (2). The user may also place the container (40) containing the food, inside the enclosure (2). If desired, the user may place the food on the slotted rack (50) arranged inside the container (40).

After closing the enclosure (2), the user can start the appliance. The heating element (31) is then supplied with electrical power. The steam generating device (1) begins to produce steam, which moves into the steam expansion chamber (3), on the one hand, and into the enclosure (2) through the one or more inlet opening(s) (5). The steam gradually fills the steam expansion chamber (3). The steam present inside the steam expansion chamber (3) tends to deform the containment wall (4) toward the enclosure (2). The steam let into the enclosure (2) through the one or more inlet opening(s) (5) tends to push out the air present inside the enclosure (2) through the one or more outlet opening(s) (6), as shown in FIG. 10. The containment wall (4) deformed toward the enclosure (2) first blocks the one or more outlet opening(s) (6) upon reaching the airtight ring (35). The containment wall (4) deformed toward the enclosure (2) then blocks the one or more inlet opening(s) (5), upon reaching the upper portion of the container (40). The containment wall (4) deformed toward the enclosure (2) comes to envelop the upper part of the food placed inside the enclosure (2), which improves the transfer of heat between the containment wall (4) heated by the steam present inside the steam expansion chamber (3) and the food present inside the enclosure (2). As long as the pressure inside the steam expansion chamber (3) remains below the high threshold, the heating element (31) remains electrically powered. This phase of operation is a preheating phase, or a temperature increase phase. When the pressure inside the steam expansion chamber (3) exceeds the high threshold, the electrical power to the heating element (31) is cut off until the pressure inside the steam expansion chamber (3) once again falls below the low threshold, and then is reestablished until the pressure inside the steam expansion chamber (3) once again rises above the high threshold, and so on. This other phase of operation is a heating and/or cooking phase, or a regulation phase, using the pressure inside the steam expansion chamber (3) to control the supply of electricity to the heating element (31). Controlling the steam pressure inside the steam expansion chamber (3) makes it possible to avoid exerting too much pressure on the food. When the slotted rack (50) is used, the cooking juice can be collected in the juice collection area (45) of the container (40). Once the desired food cooking and/or heating time has been reached, the electrical supply to the heating element (31) is switched off. This switching off can be done manually by the user or automatically by a timer or cooking program. The user can then open the enclosure (2) to remove the heated and/or cooked food. If desired, the user can take hold of the container (40) by the handles (41) extending to the exterior of the appliance, and remove it from the appliance, to bring it to the dining table.

The invention also pertains to a method of cooking and/or heating food, consisting of supplying steam to the steam expansion chamber (3), comprising the deformable and/or mobile containment wall (4) partially delimiting the enclosure (2) receiving the food to be heated and/or cooked.

Preferably, the method consists of supplying the enclosure (2) with steam before performing at least one heating and/or cooking phase without supplying the enclosure (2) with steam, in order to obtain a quicker temperature increase of the food present inside the enclosure (2).

In one method of implementation, the method consists of supplying the enclosure (2) with steam for a given period of time, preferably when the steam production begins, for example between 1 and 3 minutes.

In another method of implementation, the method consists of using the enclosure (2) comprising at least one inlet opening (5) supplied with steam, to inject steam into the enclosure through the one or more inlet opening(s) in a first phase, and of using the steam supply from the steam expansion chamber to block the one or more inlet opening(s) (5) with the containment wall (4) in a second phase.

Thus, preferably, the method consists of using an enclosure (2) comprising at least one outlet opening (6) and of supplying the enclosure (2) with steam to push out the air present inside the enclosure through the one or more outlet opening(s) (6).

The method may consist of using the steam supply from the steam expansion chamber (3) to block the one or more outlet opening(s) (6) with the containment wall (4).

Also preferably, the method consists of regulating the pressure inside the steam expansion chamber (3).

Thus, advantageously, the method consists of limiting the pressure inside the steam expansion chamber (3) to a value of less than or equal to 10 millibars, and preferably less than or equal to 5 millibars.

The invention also pertains to an appliance for cooking and/or heating food comprising a control means to operate the steam production of the steam generating device (1) using the method described in at least one of the aforementioned characteristics.

In the example of implementation illustrated in FIGS. 1 through 11, the control means comprises the pressure switch combined with the heating element (31).

As clearly shown in FIGS. 1, 10 and 11, the containment wall (4) delimits an upper part of the enclosure (2).

As a variation, the containment wall (4) is not necessarily made entirely of an elastically deformable, flexible material. The containment wall (4) may be at least partially made of an elastically deformable, flexible material. In particular, the containment wall (4) may comprise at least one rigid part, and/or several parts or portions of differing rigidity.

As a variation, the containment wall (4) does not necessarily have a resting position that is concave with respect to the enclosure (2). In particular, the containment wall (4) may have a resting position that is at least partially concave with respect to the enclosure (2). The containment wall (4) may also come into contact with the food present inside the enclosure (2) before the steam is let into the steam expansion chamber (3).

As a variation, the juice collection area (45) of the container (40) is not necessarily annular.

As a variation, the one or more inlet opening(s) (5) are not necessarily arranged in the container (40). In particular, the one or more inlet opening(s) (5) may be arranged between the container (40) and the lid (20), or in the lid (20). As a variation, the enclosure (2) does not necessarily comprise at least one inlet opening (5).

As a variation, the steam generating device (1) does not necessarily comprise a heating element (31) arranged in the bottom of a water tank (30). In particular, the steam generating device (1) may comprise a tubular or non-tubular boiler, supplied by a water tank, if desired by means of a pump, the boiler comprising or being combined with a heating element.

As a variation, the steam generating device (1) is not necessarily arranged beneath the container (40). The steam generating device (1) may, for example, be arranged in the main body (10) laterally with respect to the enclosure (2).

As a variation, the steam generating device (1) may be arranged to supply steam to the steam expansion chamber (3) and to heat the container (40) without the steam supply to the steam expansion chamber (3) necessarily being combined with the heating of the container (40) by steam. In other words, the supply of steam to the steam expansion chamber (3) by the steam generating device (1) could be controlled independently from the heating of the container (40).

As a variation, the container (40) is not necessarily heated by the steam generating device (1).

Thus preferably, the container (40) is heated by an electric heating device that is independent of the steam generating device (1). In particular, the electric heating device may comprise an electric heating element arranged beneath the container (40). The electric heating element may, for example, be brought back beneath the container (40) or be part of an electric heating plate holding the removable container (40).

As an alternative, the container (40) may, in particular, be heated by another steam generating device that is independent of the steam generating device (1) feeding the steam expansion chamber (3).

As a variation, the steam generating device (1) is not necessarily arranged in the main body (10). In particular, the steam generating device (1) may be arranged in the lid (20).

As a variation, the lid (20) is not necessarily assembled in a mobile manner on the main body (10). If desired, the lid (20) may be assembled in a removable manner on the main body (10).

As a variation, the enclosure (2) is not necessarily delimited by a lid (20). The appliance does not necessarily comprise a casing with a main body (10) forming a base that receives a lid (20). In particular, the enclosure (2) may be delimited by a door assembled to block a cavity formed in a main body.

As a variation, the steam expansion chamber (3) is not necessarily arranged in the lid (20). Thus, the containment wall (4) is not necessarily held by the lid (20). In particular, the steam expansion chamber may be arranged in the upper part of a cavity formed in a main body with a lateral opening closed by a door. Thus, the appliance for cooking and/or heating food does not necessarily comprise a lid. In particular, the appliance for cooking and/or heating food may comprise a main body arranged with a space designed to receive a container, the containment wall being held by a part of the main body extending above said space, the main body having at least one lateral opening designed for the insertion and removal of the container. In this case the containment wall also delimits an upper part of the enclosure (2). If desired, the lateral opening can be closed by a door. If desired, the lateral opening may extend over several sides of the main body, and/or several lateral openings may be provided.

As a variation, the enclosure (2) is not necessarily partially delimited by a removable container (40). If desired, the enclosure (2) may, in particular, be partially delimited by the main body of the appliance. Thus preferably, the main body of the appliance forms a container. Again if desired, the food can be arranged in at least one removable container and/or on at least one removable rack placed inside the enclosure (2).

As a variation, the containment wall (4) is not necessarily pressed onto the food only by the steam let into the steam expansion chamber (3). In particular, the containment wall (4) can be pressed onto the food at least in part by a pump arranged to inject air into the steam expansion chamber (3), and/or to suck out at least a portion of the air present inside the enclosure (2), so as to deform and/or move the containment wall (4) toward the interior of the enclosure (2). These arrangements press the containment wall (4) onto the food more effectively. These arrangements also make it possible to avoid the condensation phenomena occurring in the steam expansion chamber (3). In particular, the pump can be arranged in the main body (10) or be held by the lid (20).

The method of cooking and/or heating food using steam can thus also include a step consisting of injecting air into the steam expansion chamber (3), in order to deform and/or move the containment wall (4) toward the interior of the enclosure (2). For example, this step may occur after the supply of steam to the steam expansion chamber (3) by the steam generating device (1) has been cut off.

As an alternative or complement, the method of cooking and/or heating food using steam can thus include a step consisting of sucking out at least a portion of the air present inside the enclosure (2), to deform and/or move the containment wall (4) toward the interior of the enclosure (2). For example, this step may occur before the supply of steam to the steam expansion chamber (3) by the steam generating device (1) begins.

This invention is in no way limited to the example of implementation described and its variations, but encompasses many modifications within the scope of the claims.

The invention claimed is:

1. A method of cooking and/or heating food, comprising: supplying steam to a steam expansion chamber comprising a deformable and/or mobile containment wall partially delimiting an enclosure receiving food to be heated and/or cooked; and
using the enclosure comprising at least one inlet opening supplied with steam, to inject steam into the enclosure through one or more of the at least one inlet opening in a first phase, and using the supply of steam to the steam expansion chamber to block the one or more of the at least one inlet opening with the containment wall in a second phase.

2. The method of cooking and/or heating food according to claim 1, further comprising supplying steam to the enclosure before performing at least one heating and/or cooking phase without supplying steam to the enclosure.

3. The method of cooking and/or heating food according to claim 1, further comprising using the enclosure comprising at least one outlet opening and supplying the enclosure with steam to push out air present inside the enclosure through one or more of the at least one outlet opening.

4. The method of cooking and/or heating food according to claim 3, further comprising using the supply of steam to the steam expansion chamber to block the one or more of the at least one outlet opening with the containment wall.

5. The method of cooking and/or heating food using steam according to claim 1, further comprising regulating the pressure inside the steam expansion chamber.

6. The method of cooking and/or heating food using steam according to claim 5, further comprising limiting the pressure inside the steam expansion chamber to a value of less than or equal to 10 millibars.

7. The method of cooking and/or heating food according to claim 5, further comprising limiting the pressure inside the steam expansion chamber to a value of less than or equal to 5 millibars.

8. The method of cooking and/or heating food using steam according to claim 1, further comprising sucking out at least a portion of the air inside the enclosure, in order to deform and/or move the containment wall toward an interior of the enclosure.

9. The method for cooking and/or heating food according to claim 1, wherein the steam expansion chamber is adjacent to the enclosure.

10. The method for cooking and/or heating food according to claim 1, wherein the containment wall is at least partially made of an elastically deformable, flexible material.

11. An appliance for cooking and/or heating food comprising control means to operate the production of steam by a steam generating device according to a pressure inside a steam expansion chamber and for starting the method of cooking and/or heating food using steam as described in claim 1.

12. The method for cooking and/or heating food according to claim 1, wherein the deformable and/or mobile containment wall separates the steam expansion chamber and the enclosure.

13. A method of cooking and/or heating food using steam comprising:
   supplying steam to a steam expansion chamber comprising a deformable and/or mobile containment wall partially delimiting an enclosure receiving food to be heated and/or cooked;
   injecting air into the steam expansion chamber to deform and/or move the containment wall toward an interior of the enclosure; and
   supplying steam to the enclosure before performing at least one heating and/or cooking phase without supplying steam to the enclosure.

14. The method of cooking and/or heating food according to claim 13, further comprising using the enclosure comprising at least one outlet opening and supplying the enclosure with steam to push out air present inside the enclosure through one or more of the at least one outlet opening.

15. The method of cooking and/or heating food using steam according to claim 13, further comprising regulating the pressure inside the steam expansion chamber.

16. The method of cooking and/or heating food using steam according to claim 15, further comprising limiting the pressure inside the steam expansion chamber to a value of less than or equal to 10 millibars.

17. The method of cooking and/or heating food according to claim 15, further comprising limiting the pressure inside the steam expansion chamber to a value of less than or equal to 5 millibars.

18. The method of cooking and/or heating food using steam according to claim 13, further comprising sucking out at least a portion of the air inside the enclosure, in order to deform and/or move the containment wall toward an interior of the enclosure.

19. The method for cooking and/or heating food according to claim 13, wherein the steam expansion chamber is adjacent to the enclosure.

20. The method for cooking and/or heating food according to claim 13, wherein the containment wall is at least partially made of an elastically deformable, flexible material.

21. An appliance for cooking and/or heating food comprising control means to operate the production of steam by a steam generating device according to a pressure inside a steam expansion chamber and for starting the method of cooking and/or heating food using steam as described in claim 13.

22. A method of cooking and/or heating food using steam comprising: supplying steam to a steam expansion chamber comprising a deformable and/or mobile containment wall partially delimiting an enclosure receiving food to be heated and/or cooked;
   injecting air into the steam expansion chamber to deform and/or move the containment wall toward an interior of the enclosure;
   using the enclosure comprising at least one outlet opening and supplying the enclosure with steam to push out air present inside the enclosure through one or more of the at least one outlet opening; and
   using the supply of steam to the steam expansion chamber to block the one or more of the at least one outlet opening with the containment wall.

23. A method for cooking and/or heating food using steam comprising: supplying steam to a steam expansion chamber comprising a deformable and/or mobile containment wall partially delimiting an enclosure receiving food to be heated and/or cooked; and
   injecting air into the steam expansion chamber to deform and/or move the containment wall toward an interior of the enclosure,
   wherein the deformable and/or mobile containment wall separates the steam expansion chamber and the enclosure.

* * * * *